United States Patent
Reeder

(10) Patent No.: US 11,243,002 B2
(45) Date of Patent: Feb. 8, 2022

(54) SMART AIR VENT

(71) Applicant: Alarm.com Incorporated, Tysons, VA (US)

(72) Inventor: Alexander Lawrence Reeder, Arlington, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/259,117

(22) Filed: Jan. 28, 2019

(65) Prior Publication Data

US 2019/0234632 A1 Aug. 1, 2019

Related U.S. Application Data

(60) Provisional application No. 62/622,638, filed on Jan. 26, 2018.

(51) Int. Cl.
*F24F 11/00* (2018.01)
*G05B 19/048* (2006.01)
(Continued)

(52) U.S. Cl.
CPC .......... *F24F 11/0001* (2013.01); *F24F 11/74* (2018.01); *F24F 11/79* (2018.01);
(Continued)

(58) Field of Classification Search
CPC .......... F24F 11/001; F24F 11/63; F24F 11/58; F24F 2110/20; F24F 2110/50;
(Continued)

(56) References Cited

U.S. PATENT DOCUMENTS 4,614,939 A * 9/1986 Wang ............... G08B 21/20
340/540
4,616,559 A * 10/1986 Barlow ............. F24F 3/048
454/298

(Continued)

FOREIGN PATENT DOCUMENTS

CN 105841294 A * 8/2016

OTHER PUBLICATIONS

Notification of Transmittal of the International Search Report and the Written Opinion of the International Searching Authority, or the Declaration, International Application No. PCT/US19/15363, dated Apr. 4, 2019, total pp. 20.

*Primary Examiner* — Allen R. B. Schult
(74) *Attorney, Agent, or Firm* — Fish & Richardson P.C.

(57) ABSTRACT

A method includes receiving, by a monitoring system that is configured to monitor a property, and from a sensor, sensor data, receiving data indicating an operational state of the HVAC system, determining that the HVAC system is providing air to a smart vent device, determining (i) a particular direction for the smart vent device to direct air flowing from the HVAC system and into the room of the property and (ii) a particular flow rate for the smart vent device to provide air from the HVAC system and into the room of the property, and providing, to the smart vent device, instructions to (i) direct air flowing from the HVAC system and into the room of the property in the particular direction and (ii) adjust the flow rate of air flowing from the HVAC system and into the room of the property according to the particular flow rate.

17 Claims, 5 Drawing Sheets

(51) Int. Cl.
- *F24F 11/79* (2018.01)
- *F24F 11/74* (2018.01)
- *G05B 19/042* (2006.01)
- *F24F 11/63* (2018.01)
- *F24F 120/10* (2018.01)
- *F24F 110/10* (2018.01)
- *F24F 130/10* (2018.01)
- *F24F 11/58* (2018.01)
- *F24F 110/20* (2018.01)
- *F24F 110/50* (2018.01)

(52) U.S. Cl.
CPC ......... *G05B 19/042* (2013.01); *G05B 19/048* (2013.01); *F24F 11/58* (2018.01); *F24F 11/63* (2018.01); *F24F 2110/10* (2018.01); *F24F 2110/20* (2018.01); *F24F 2110/50* (2018.01); *F24F 2120/10* (2018.01); *F24F 2130/10* (2018.01); *G05B 2219/2614* (2013.01)

(58) Field of Classification Search
CPC . F24F 2110/10; F24F 2120/10; G05B 19/048; G05B 2219/2614
USPC .......................................................... 454/256
See application file for complete search history.

(56) References Cited

U.S. PATENT DOCUMENTS

| | | | |
|---|---|---|---|
| 4,775,001 A * | 10/1988 | Ward | F24F 3/00 165/108 |
| 5,156,203 A * | 10/1992 | Funakoshi | G05D 23/1905 165/207 |
| 2014/0085093 A1 | 3/2014 | Mittleman | |
| 2014/0312126 A1 | 10/2014 | Ramini | |
| 2014/0330438 A1 | 11/2014 | Haines | |
| 2015/0320588 A1* | 11/2015 | Connor | A61F 7/0085 607/107 |
| 2015/0369504 A1 | 12/2015 | Flaherty | |
| 2016/0341439 A1 | 11/2016 | Karamanos | |
| 2016/0363341 A1* | 12/2016 | Arens | F24F 7/007 |
| 2017/0030605 A1* | 2/2017 | Heller | F24F 11/30 |
| 2019/0285307 A1* | 9/2019 | Sugiyama | F24F 11/65 |

\* cited by examiner

SMART AIR VENT

CROSS REFERENCE TO RELATED APPLICATION

This application claims benefit of U.S. Provisional Application No. 62/622,638 filed Jan. 26, 2018, and titled "Smart Air Vent," which is incorporated by reference in its entirety.

TECHNICAL FIELD

This disclosure relates to property monitoring technology and, for example, integrating a monitoring system at a property with one or more smart air vents.

BACKGROUND

Many people equip homes and businesses with monitoring systems to provide increased security for their homes and businesses. These monitoring systems include several electronic components including sensors that may detect several different activities within the monitored property.

SUMMARY

Techniques are described for monitoring technology. For example, techniques are described for integrating a monitoring system with one or more smart air vents. The monitoring system may be configured to determine the occupancy of the one or more rooms throughout the property, and may decide whether to adjust the air flow from each of the smart air vents based on the occupancy data.

According to an innovative aspect of the subject matter described in this application, a monitoring system that is configured to monitor a property includes a sensor that is configured to generate sensor data that reflects an attribute of the property, a smart vent device that is configured to direct air flowing from an HVAC system of the property to a room of the property and adjust a flow rate of air flowing from an HVAC system of the property to a room of the property, and a monitor control unit. The monitoring control unit is configured to receive the sensor data, receive, from the HVAC system, data indicating an operational state of the HVAC system, based on receiving the data indicating the operational state of the HVAC system, determine that the HVAC system is providing air to the smart vent device, based on the sensor data and based on determining that the HVAC system is providing air to the smart vent device, determine (i) a particular direction for the smart vent device to direct air flowing from the HVAC system and into the room of the property and (ii) a particular flow rate for the smart vent device to provide air from the HVAC system and into the room of the property, and provide, to the smart vent device, instructions to (i) direct air flowing from the HVAC system and into the room of the property in the particular direction and (ii) adjust the flow rate of air flowing from the HVAC system and into the room of the property according to the particular flow rate.

These and other implementations each optionally include one or more of the following features. The monitoring system includes a camera that is configured to generate image data, and the monitor control unit is configured to receive the sensor data by receiving the image data, based on the image data, determine that a person entered the room of the property where the smart vent device is located, determine (i) a particular direction for the smart vent device to direct air flowing from the HVAC system and into the room of the property and (ii) a particular flow rate for the smart vent device to provide air from the HVAC system and into the room of the property by determining (i) the particular direction towards the person and (ii) the particular flow rate that is lower than a current flow rate based on determining that the person entered the room of the property where the smart vent device is located, and provide, to the smart vent device, instructions to (i) direct air flowing from the HVAC system and into the room of the property in the particular direction and (ii) adjust the flow rate of air flowing from the HVAC system and into the room of the property according to the particular flow rate by providing, to the smart vent device, instructions to (i) direct air flowing from the HVAC system and into the room of the property in the particular direction towards the person and (ii) decrease the flow rate of air flowing from the HVAC system and into the room of the property to the particular flow rate.

The monitoring system includes a camera that is configured to generate image data, and the monitor control unit is configured to receive the sensor data by receiving the image data, based on the image data, determine that a person entered the room of the property where the smart vent device is located, determine (i) a particular direction for the smart vent device to direct air flowing from the HVAC system and into the room of the property and (ii) a particular flow rate for the smart vent device to provide air from the HVAC system and into the room of the property by determining (i) the particular direction away from the person and (ii) the particular flow rate that is higher than a current flow rate based on determining that the person entered the room of the property where the smart vent device is located, and provide, to the smart vent device, instructions to (i) direct air flowing from the HVAC system and into the room of the property in the particular direction and (ii) adjust the flow rate of air flowing from the HVAC system and into the room of the property according to the particular flow rate by providing, to the smart vent device, instructions to (i) direct air flowing from the HVAC system and into the room of the property in the particular direction away from the person and (ii) increase the flow rate of air flowing from the HVAC system and into the room of the property to the particular flow rate.

The monitoring system includes an infrared detector that is configured to thermal radiation, and the monitor control unit is configured to receive the sensor data by receiving thermal radiation data, based on the thermal radiation data, determine that a person with an elevated body temperature is in the room of the property where the smart vent device is located, determine (i) a particular direction for the smart vent device to direct air flowing from the HVAC system and into the room of the property and (ii) a particular flow rate for the smart vent device to provide air from the HVAC system and into the room of the property by determining (i) the particular direction towards the person and (ii) the particular flow rate that is higher than a current flow rate based on determining that the person with an elevated body temperature is in the property where the smart vent device is located, and provide, to the smart vent device, instructions to (i) direct air flowing from the HVAC system and into the room of the property in the particular direction and (ii) adjust the flow rate of air flowing from the HVAC system and into the room of the property according to the particular flow rate by providing, to the smart vent device, instructions to (i) direct air flowing from the HVAC system and into the room of the property in the particular direction towards the person and (ii) increase the flow rate of air flowing from the HVAC system and into the room of the property to the particular flow rate.

The monitoring system includes a motion detector that is configured to generate motion data, and the monitor control unit is configured to receive the sensor data by receiving the motion data, based on the motion data, determine that a person entered the room of the property where the smart vent device is located, determine (i) a particular direction for the smart vent device to direct air flowing from the HVAC system and into the room of the property and (ii) a particular flow rate for the smart vent device to provide air from the HVAC system and into the room of the property by determining (i) the particular direction towards the person and (ii) the particular flow rate that is higher than a current flow rate based on determining that the person entered the room of the property where the smart vent device is located, and provide, to the smart vent device, instructions to (i) direct air flowing from the HVAC system and into the room of the property in the particular direction and (ii) adjust the flow rate of air flowing from the HVAC system and into the room of the property according to the particular flow rate by providing, to the smart vent device, instructions to (i) direct air flowing from the HVAC system and into the room of the property in the particular direction towards the person and (ii) increase the flow rate of air flowing from the HVAC system and into the room of the property to the particular flow rate.

The monitoring system includes a motion detector that is configured to generate motion data, and the monitor control unit is configured to receive the sensor data by receiving the motion data, based on the motion data, determine that a person entered the room of the property where the smart vent device is located, determine (i) a particular direction for the smart vent device to direct air flowing from the HVAC system and into the room of the property and (ii) a particular flow rate for the smart vent device to provide air from the HVAC system and into the room of the property by determining (i) the particular direction away from the person and (ii) the particular flow rate that is lower than a current flow rate based on determining that the person entered the room of the property where the smart vent device is located, and provide, to the smart vent device, instructions to (i) direct air flowing from the HVAC system and into the room of the property in the particular direction and (ii) adjust the flow rate of air flowing from the HVAC system and into the room of the property according to the particular flow rate by providing, to the smart vent device, instructions to (i) direct air flowing from the HVAC system and into the room of the property in the particular direction away from the person and (ii) decrease the flow rate of air flowing from the HVAC system and into the room of the property to the particular flow rate.

The monitoring system includes an additional smart vent device that is configured to direct air flowing from the HVAC system of the property to the room of the property and adjust a flow rate of air flowing from the HVAC system of the property to the room of the property, and the monitor control unit is configured to provide, to the additional smart vent device, instructions to (i) direct air flowing from the HVAC system and into the room of the property in the particular direction and (ii) adjust the flow rate of air flowing from the HVAC system and into the room of the property according to the particular flow rate. The monitor control unit is configured to receive, from a user, a timing schedule that identifies a time range for increasing or decreasing air flow rate for the smart vent device, compare a current time to the time range for increasing or decreasing the air flow rate for the smart vent device, determine that the current time is within the time range for increasing or decreasing the air flow rate for the smart vent device, based on determining that the current time is within the time range for increasing or decreasing the air flow rate for the smart vent device, determine to increase or decrease the flow rate for the smart vent device to provide air from the HVAC system and into the room of the property, and provide, to the smart vent device, instructions to increase or decrease the flow rate of air flowing from the HVAC system and into the room of the property to the particular flow rate.

The monitor control unit is further configured to based on the sensor data, detect that a person is issuing a command, determine (i) the particular direction for the smart vent device to direct air flowing from the HVAC system and into the room of the property and (ii) the particular flow rate for the smart vent device to provide air from the HVAC system and into the room of the property based on the command. The monitoring system includes a camera that is configured to generate image data, and the monitor control unit is configured to receive the sensor data by receiving the image data, and detect that the person is issuing the command based on the image data. The monitoring system includes a microphone that is configure to detect sound, and the monitor control unit is configured to receive sensor data by receiving sound data, and detect that the person is issuing the command based on the sound data.

The monitor control unit is further configured to determine that an armed status of the monitoring system is armed away, determine (i) a particular direction for the smart vent to direct air flowing from the HVAC and into the room of the property and (ii) a particular flow rate for the smart vent device to provide air from the HVAC system and into the room of the property by determining (i) the particular direction towards a zone of the room the person is likely to enter and (ii) the particular flow rate that is higher than a current flow rate based on determining that the monitoring system is armed away, and provide, to the smart vent device, instructions to (i) direct air flowing from the HVAC and into the room of the property toward a zone of the room the person is likely to enter and (ii) increase the flow rate of the air flowing from the HVAC system and into the room of the property to the higher flow rate.

The monitoring system includes an additional smart vent device that is configured to direct air flowing from an HVAC system of the property to an additional room of the property and adjust a flow rate of air flowing from the HVAC system of the property to the additional room of the property, and the monitor control unit is further configured to determine that an armed status of the monitoring system is unarmed, receive, from an additional smart vent device, additional sensor data, in response to determining that the armed status of the monitoring system is unarmed, determine that the room of the property is occupied and the additional room of the property is unoccupied, based on determining that the room of the property is occupied and the additional room of the property is unoccupied, determine (i) a particular flow rate for the smart vent device to provide air from the HVAC system and into the room of the property by determining a particular flow rate that is higher than a current flow rate, (ii) a particular flow rate for the additional smart vent device to provide air from the HVAC system and into the second room of the property by determining a particular flow rate that is lower than a current flow rate.

The monitor control unit is further configured to receive, from a user, data indicating a set flow rate for a smart vent device, and based on receiving the data indicating the set flow rate for the smart vent device, provide, to the smart vent device, instructions to adjust the flow rate of air flowing from the HVAC system and into the room of the property according to the set flow rate. The smart vent device includes a fan that is configured to adjust the air flow of the smart vent device. The smart vent device includes the sensor and the monitor control unit. The smart vent device includes an air vent that is configured to mix room temperature air or outdoor air with air flowing from the HVAC system. The smart vent device includes one or more adjustable baffles that are configured to adjust the direction of the air flowing from the HVAC system. The smart vent device includes a temperature sensor.

According to another innovative aspect of the subject matter described in the application, a computer implemented method includes, receiving, by a monitoring system that is configured to monitor a property, and from a sensor that is configured to generate sensor data that reflects an attribute of the property, sensor data, receiving, by the monitoring system and from an HVAC system, data indicating an operational state of the HVAC system, based on receiving the data indicating the operational state of the HVAC system, determining, by the monitoring system, that the HVAC system is providing air to a smart vent device that is configured to direct air flowing from the HVAC system of the property to a room of the property and adjust a flow rate of air flowing from the HVAC system of the property to a room of the property, based on the sensor data and based on determining that the HVAC system is providing air to the smart vent device, determining, by the monitoring system (i) a particular direction for the smart vent device to direct air flowing from the HVAC system and into the room of the property and (ii) a particular flow rate for the smart vent device to provide air from the HVAC system and into the room of the property, and providing, to the smart vent device, instructions to (i) direct air flowing from the HVAC system and into the room of the property in the particular direction and (ii) adjust the flow rate of air flowing from the HVAC system and into the room of the property according to the particular flow rate.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Achieving human thermal comfort within a home equipped with a central HVAC system is complicated. Most HVAC systems use temperature as the only input when determining how to heat or cool an area of the house. However, there are a number of other factors that contribute to a resident's thermal comfort such as clothing, humidity, radiation exchange, vent air speed, and vent air temperature. One of the biggest issues residents in a home with a central HVAC system is the disparity in "feels like" temperatures experienced at a single location in the house that is in the path of the air blowing out of the vent. For example, in the summer a resident may be sitting on the couch wearing a T-shirt and shorts. Initially, when the A/C kicks on, the cool breeze is welcomed after many minutes of stagnant air. However, ten minutes into the cooling cycle, the cool air coming out of the vent is several degrees cooler than it was at the one minute mark. The resident has been exposed to a continuous stream of fast-moving cool air that has been pulling heat out of the resident at an increasingly rapid rate. At this time, the resident may start to feel a little chilly, when the cycle finally ends and the A/C cuts off, the resident may immediately feel like the temperature has jumped up many degrees, even though the temperature at the thermostat has not changed at all. This is because thermal comfort of the resident is based on heat transfer rather than air temperature alone.

Techniques are described for integrating a monitoring system with one or more smart air vents. The monitoring system may be configured to determine the occupancy of the one or more rooms throughout the property, and may decide whether to adjust the air flow from each of the smart air vents based on the occupancy data. The one or more smart air vents may also be configured to receive verbal commands or gestures from a user to adjust the air flow rate out of a smart air vent.

Figure 1:
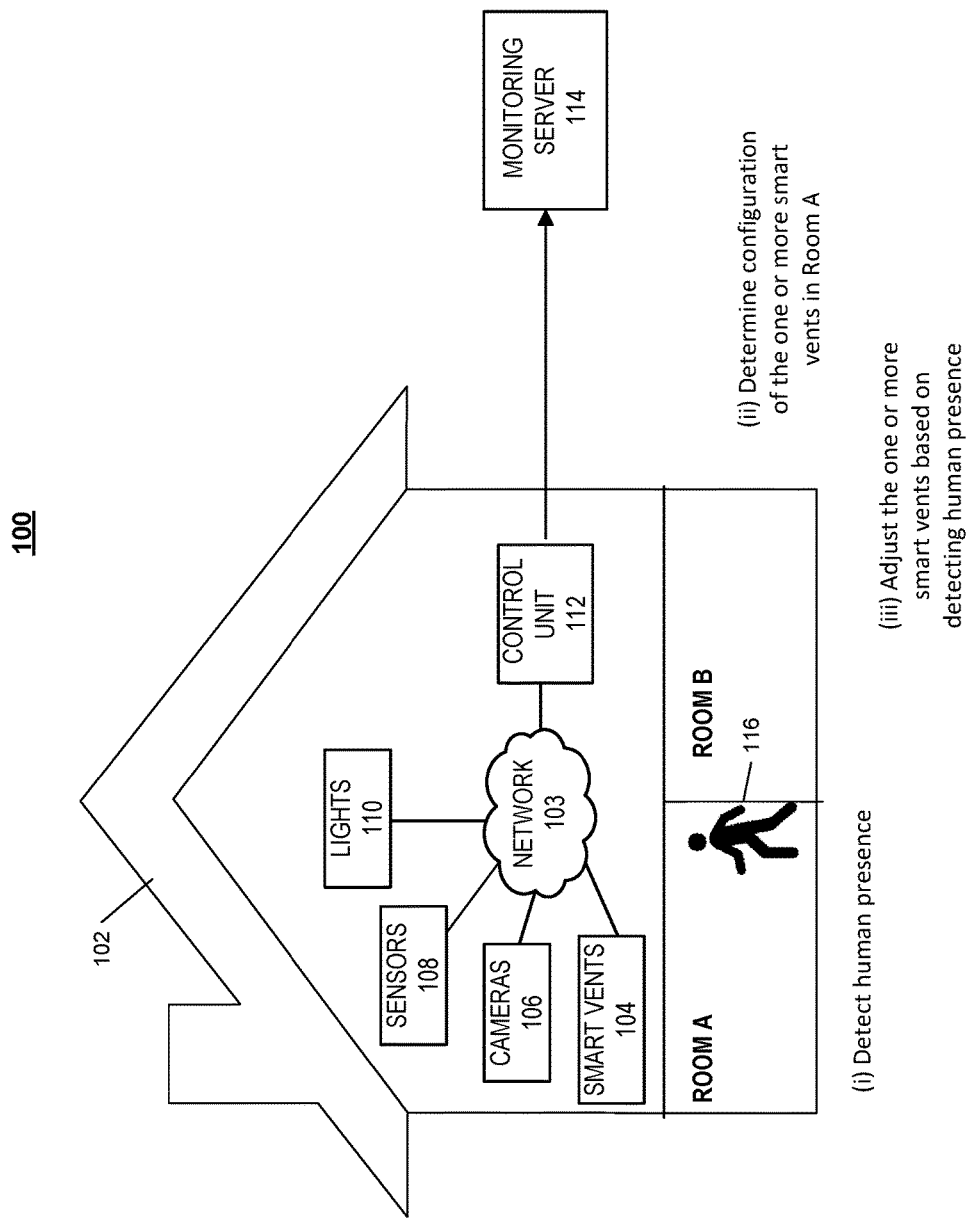
FIG. 1 illustrates an example of a monitoring system at a monitored property.

FIG. 1 illustrates an example of a monitoring system at a monitored property that is integrated with one or more smart vents. As shown in FIG. 1, a property 102 (e.g. a home) of a user 116 is monitored by an in-home monitoring system (e.g., in-home security system) that includes components that are fixed within the property 102. The in-home monitoring system may include a control unit 112, one or more lights 110, one or more sensors 108, one or more cameras 106, and one or more smart air vents 104.

The one or more smart vents 104 may replace regular manual vents, and may have a similar size and physical appearance of a typical manual vent. The one or more smart vents 104 may include a radio that allows each of the one or more smart vents 104 to communicate with the control unit 112, and with other smart vents located throughout the monitored property 102. The one or more smart vents 104 may communicate through Z-Wave, Bolt, Wi-Fi, Bluetooth, or any other appropriate wireless communication. Each of the one or more smart vents 104 may automatically adjust the air flow rate and air flow direction based on the detected room occupancy.

One or more smart vents 104 may be located throughout every room of the monitored property. In some examples, each room of the monitored property 102 may include one smart vent, in other examples, one room may include one smart vent and another may include two smart vents. The one or more smart vents 104 communicate wirelessly with the control unit 112 and the one or more other smarts vents within the other rooms of the monitored property 102. As illustrated in FIG. 1, the user 116 may move from Room B to Room A, and the one or more smart vents 104 in Room A may detect the presence of the user 116.

In some implementations, the one or more smart vents 104 include a camera on a front panel of the smart vent 104, the camera of the smart vent 104 may use one or more classification analytics to identify where humans are located within the room. For example, a motion sensor in Room A may detect motion and communicate with the camera of the smart vent in Room A to capture data to determine whether a human moved into the room. The camera of the smart vent 104 may include a PIR sensor that is configured to detect heat radiated from living objects, and a low light sensor that is configured to detect movement of a living organism within the field of view of the sensor and camera lens. For example, the camera of the smart vent may detect heat radiated of the user 116 when the user enters Room A, and determines that that a human is present in the room.

In other implementations, each of the one or more rooms within the monitored property 102 include one or more cameras 106 that are equipped with PIR sensors. When the user 116 enters the Room A, the one or more cameras 106 may use classification analytics along with PIR technology to determine that a human is present in the room. In some examples, the PIR sensors within the one or more cameras 106 may be configured to identify a human presence within a specific zone of the one or more zones within a particular room of the property 102. In other examples, the one or more cameras communicate the captured data to the control unit 112 and the control unit 112 uses classification analytics to determine that a human is present.

When at least one smart vent within Room A detects human presence within the room, the smart vent determines the configuration of the one or more smart vents 104 within the room. The smart vent determines the direction of the air flow, the air flow rate, the temperature set point of the HVAC system, and any other appropriate setting. Based on the location of the user 116 and one or more rules and schedules set by the user 116, the one or more smart vents 104 within Room A adjusts the configurations of at least one of the smart vents.

The user 116 may be a resident of the monitored property 102, and may set one or more rules and schedules for the configuration for the one or more smarts vents 104 through accessing a smart vent application. The smart vent application may allow a user 116 to configure one or more different operating modes for the smart vent system. For example, the user 116 may configure an operating mode that when selected limits the volumetric flow rate of air through the smart vent in the master bedroom vent to a default setting of 2 cubic feet per second until motion is detected by the smart vent, and when the room is determined to be occupied, the volumetric flow rate is automatically increased to 10 cubic feet per second. For another example, the user 116 may configure an oscillation operating mode that when selected causes the baffles to be in constant motion adjusting the flow or air across the one or more spatial zones of a room.

The user 116 may set one or more time schedules for the one or more configured operating modes. For example, the user may configure to set the smart vent system to oscillation mode between 8:00 PM and 6:00 AM. The user 116 may configure an "avoid human" operating mode that when selected causes the one or more smart vents 104 to avoid blowing air into the spatial zone of a room occupied by a human. The user 116 may also configure a "temperature balancing" operating mode that when selected causes the one or more smart vents 104 located throughout the property 102 to adjust their flow rates in order to balance a room temperature based on a temperature reading received from remote temperature sensors. The settings associated with each of the user configured operating modes and schedules are stored at the back end server that manages the smart vent application. In some implementations, the smart vent application may be managed by the control unit 112, and in other implementations, the smart vent application may be managed by the monitoring server 114.

The one or more smart vents 104 within Room A may adjust their settings based on determining the current settings of the one or more smart vents 104 in the room, and the user set operating mode. For example, Room A may include one smart vent, the smart vent may be flowing air at a flow rate of 3 cubic feet per second while in oscillation mode. When the smart vent detects human presence in the room, the smart vent may increase the flow rate and change the air flow to avoid blowing air in the spatial zone where the human is detected. In another example, the smart vent may change the air flow to direct the air into the spatial zone where the human is detected. In other examples, the smart vent may direct the air to blow in the spatial zone where the human is detected at a flow rate of 2 cubic feet per second for sixty seconds, and then directs the air to blow away from the human at a rate of 5 cubic feet per second for five minutes. The smart vent may repeat the cycle based on whether the human stays in the room or moves to another room of the property 102.

In some implementations, when a user vacates a room, the one or more smart vents within the vacated room may revert back to their previous configurations. In other words, when the user 116 enters Room A, the one or more smart vents may adjust the configuration of the one or more smarts vents in Room A based on detecting the presence of the user 116, and when the user 116 leaves Room A, the one or more smart vents 104 determine that a human is no longer present in the room, and may return the one or more smart vents 104 to their previous configuration. For example, when the user 116 enters Room A, the one or more smart vents may detect the user 116 and direct the baffles of the one or more smart vents to blow air into the spatial zone with the user, when the user 116 leaves Room A, the baffles of the one or more smart vents may blow air into one or more spatial zones of the room.

In some implementations, when the user 116 vacates Room A, the one or more smart vents may decrease the volumetric flow rate of the air flowing out of the vents. For example, when the user 116 vacates Room A, the volumetric flow rate may decrease to 2 cubic feet per second. In other implementations, when the user vacates a room, the one or more smart vents within the room may completely close the baffles of the one or more vents.

In some implementations, the one or more smart vents may be configured to detect when a user is under a blanket, and may adjust the airflow. For example, when a user is sitting in the living room and covers with a blanket, the camera of the smart vent in the living room may detect the user is covering themselves with a blanket. The camera of the smart vent may be configured to used object recognition and classification techniques to determine whether the user is covered by a blanket. When the HVAC system is set to heat, and the camera determines the user is covered with a blanket, the smart vent may direct the baffles of the smart vent to blow into the spatial zone of the user, and may also increase the flow rate of the air. When the HVAC system is set to air conditioning, and the camera determines the user is covered with a blanket, the smart vent may direct the baffles of the smart vent away from the spatial zone of the user. In some examples, the smart vent may shut off the air flow, or decrease the air flow to 0.5 cubic feet per second.

In some implementations, the one or more smart vents may be configured to learn the preferences of the one or more residents of the monitored property. In these implementations, the one or more smart vents may store historical information associated with the user. For example, the one or more smart vents over time may determine that user A wants the air to blow in their direction and user B want the air to blow away from them.

Figure 2:
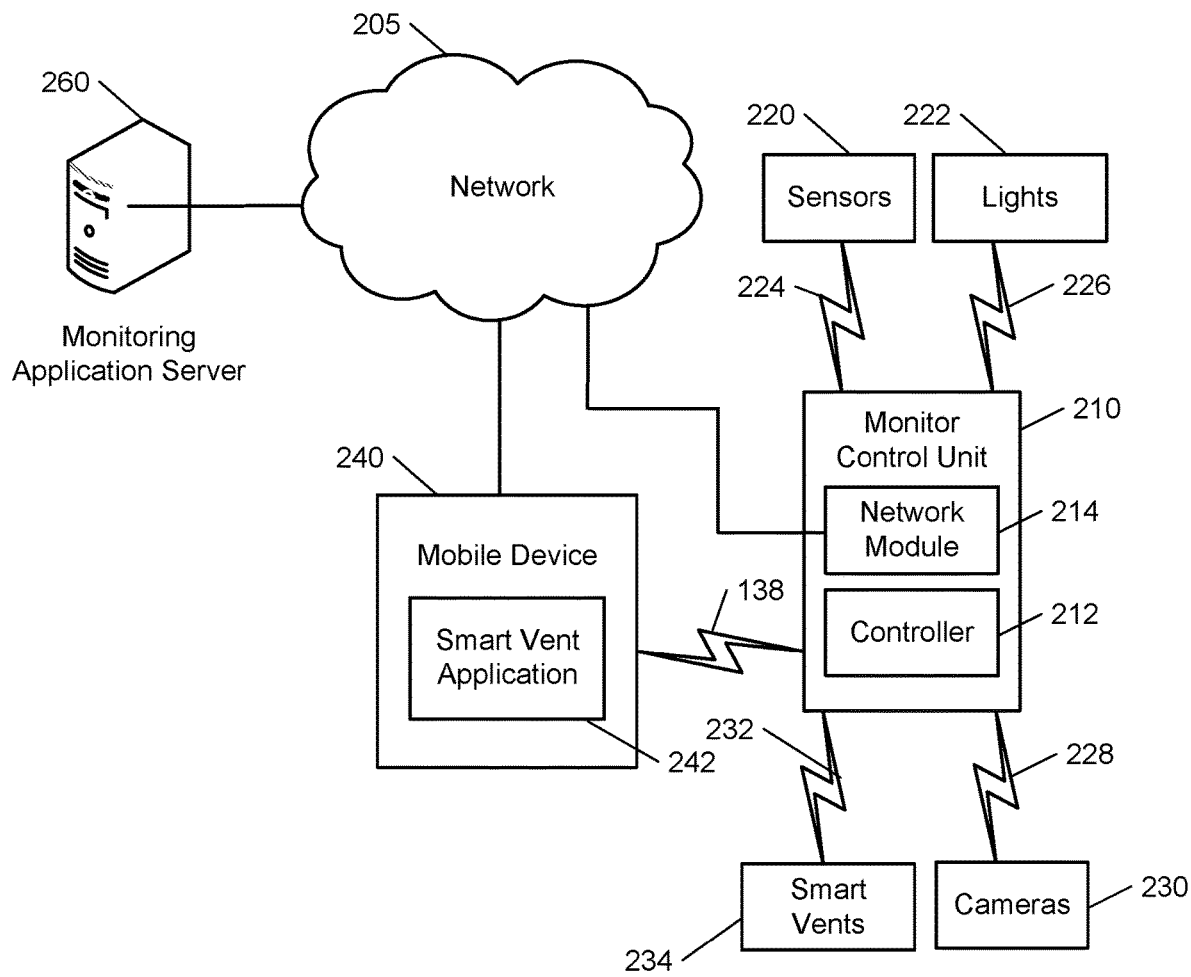
FIG. 2 illustrates an example of a monitoring system integrated with one or more smart air vents.

FIG. 2 illustrates an example of a system 200 configured to monitor a property. The system 200 includes a network 205, a monitoring system control unit 210, one or more user devices 240, and a monitoring application server 260. The network 205 facilitates communications between the monitoring system control unit 210, the one or more user devices 240, and the monitoring application server 260. The network 205 is configured to enable exchange of electronic communications between devices connected to the network 205. For example, the network 205 may be configured to enable exchange of electronic communications between the monitoring system control unit 210, the one or more user devices 240, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from cameras, sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The one or more cameras 230 may be a video/photographic camera or other type of optical sensing device configured to capture images. For instance, the one or more cameras 230 may be configured to capture images of an area within a building monitored by the monitor control unit 210. The one or more cameras 230 may be configured to capture single, static images of the area and also video images of the area in which multiple images of the area are captured at a relatively high frequency (e.g., thirty images per second). The one or more cameras 230 may be controlled based on commands received from the monitor control unit 210.

The monitoring system may include one or more smart vents 234. Each of the one or more smart vents may be battery powered and may include a radio that allows each of the one or more smart vents to communicate over the network with the monitor control unit and each of the other one or more smart vents. The one or more smart vents may have a similar size and physical appearance of a typical manual vent, and may replace the regular manual vents throughout the monitored property.

The sensors 220, the lights 222, the smart vents 234, and the cameras 230 communicate with the controller 212 over communication links 224, 226, 228, and 230. The communication links 224, 226, and 228 may be a wired or wireless data pathway configured to transmit signals from the sensors 220, the tracking devices 222, and the cameras 230 to the controller 212. The communication link 224, 226, and 228 may include a local network, such as, 802.11 "Wi-Fi" wireless Ethernet (e.g., using low-power Wi-Fi chipsets), Z-Wave, Power Over Ethernet (POE), Zigbee, Bluetooth, "HomePlug" or other Powerline networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a smart vent application 242. The smart vent application 242 refers to a software/firmware program running on the corresponding mobile device that enables the user interface and features described throughout. The user device 240 may load or install the smart vent application 242 based on data received over a network or data received from local media. The smart vent application 242 runs on mobile devices platforms, such as iPhone, iPod touch, Blackberry, Google Android, Windows Mobile, etc.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as Wi-Fi, Bolt, Lora, Bluetooth, Z-Wave, ZigBee, "HomePlug," or other Powerline networks that operate over AC wiring, or Power over Ethernet (POE), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication.

Figure 3:
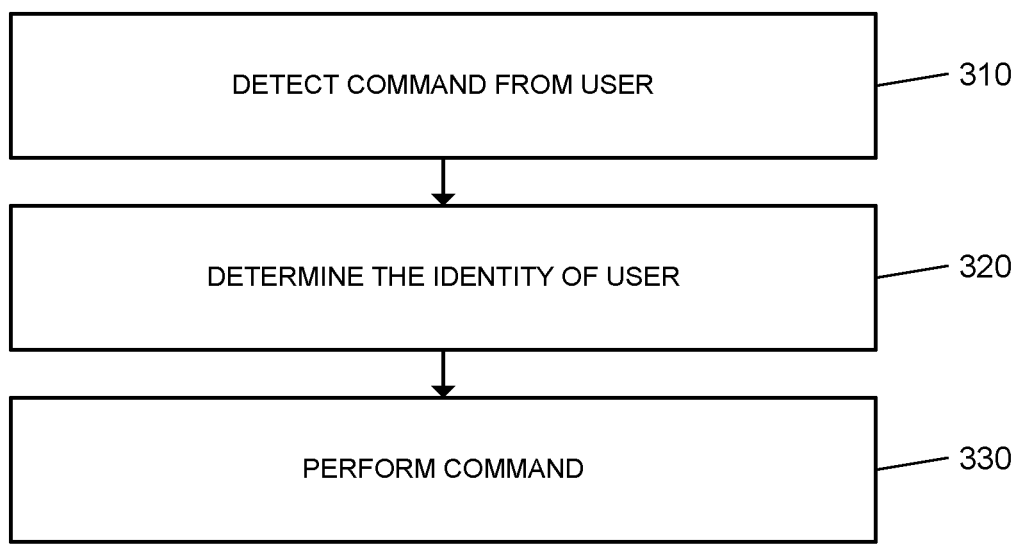
FIG. 3 is a flow chart of an example process for performing a command by a smart vent.

FIG. 3 illustrates an example process 300 for performing a command. The smart air vent detects a command from a user (310). The smart vent is configured to detect a command in the form of a gesture or a voice command. Each of the one or more smart vents 104 are configured to detect one or more gestures from a user. In some examples, each of the one or more smart vents 104 include a camera on a front panel of the smart vent. In these examples, the camera located on the front panel of the smart vent is configured perform classification analytics to detect the one or more gestures from a user. In other examples, a room where a smart vent is located may include one or more cameras 106 that are in communication with the smart vent and are configured to perform classification analytics to detect gestures from a user. When at least one of the one or more cameras 106 detect a user performing a gesture, the at least one camera communicates with the smart vent over the network 105. In some implementations, the at least one camera may communicate with the control unit 112 and the control unit 112 in turn communicates with the smart vent.

The one or more cameras 106 may each include a PIR sensor that is configured to detect heat radiated from living objects, and a low light sensor that is configured to detect movement of a living organism within the field of view of the sensor and camera lens. In some implementations, when a user enters a room within the monitored property 102, at least one camera detects movement of the user and may begin to capture video data to determine whether the user is performing any gestures. The camera may perform a variety of video analytics techniques to determine whether the user is performing a gesture and to determine which gesture the user is performing. In some implementations, the smart vent may include a PIR sensor on the front surface of the vent.

Each of the one or more smart vents 104 are configured to perform one or more actions in response to detecting a user performing a gesture. For example, a smart vent may detect a user making an 'X' gesture with their hands, and the smart vent may adjust the baffles of the vent to avoid blowing air into the spatial zone of the user based on detecting this gesture. For another example, a smart vent may detect a user performing a fanning motion, and the smart vent may adjust the baffles of the vent to blow air into the spatial zone of the user based on detecting this gesture.

The user 116 may configure the one or more smart vents 104 to recognize one or more different gestures by accessing a smart vent application that is hosted on a mobile device. During the initial configuration of the one or more smarts vents by a user 116, the user 116 may configure a gesture for increasing the air flow, decreasing air flow, shutting off the air flow, increasing the set point temperature of the HVAC system, decreasing the set point temperature of the HVAC system, and any other appropriate gesture. The user 116 may train the system to detect the gestures from the one or more residents of the monitored property 102.

The user 116 may use the smart vent application to adjust the settings for each of the one or more smart vents located throughout the monitored property 102. The user may adjust the direction of the air flow into one or more different spatial zones of a room. For example, the user may select to direct the air flow to the floor or to the ceiling of a room. The user may select to open or close particular smart vents throughout the monitored property 102. For example, the user may select to close the smarts vents in the living room and the kitchen, and may select to open the smart vent in the master bedroom and the guest bedroom.

Each of the one or more smart vents 104 may be configured to receive voice commands from users. The user may configure one or more voice commands through the smart vent application on the user's mobile device. The one or more smart vents 104 may include a microphone that detects the voice of a user. For example, the user may configure the one or more smart vents to change the air flow to flow into the spatial zone of a user when the user commands a vent to blow air on me. In another example, the user may configure the one or more smart vents to shut off the airflow when the user commands a vent to shut off air flow, or to close vent.

The smart vent determines the identity of the user (320). When a camera of a smart vent detects a gesture from a user, the camera may perform one or more facial recognition techniques on the captured data to determine the identity of the user. Each of the one or more residents of the monitored property 102 may access the smart vent application on their mobile devices to register a user profile. In some examples, when a user accesses the smart vent application to configure a user profile, the smart vent application may prompt a camera on the mobile device to capture one or more selfies of the user. The one or more captured images of the user may be stored in association with the specific user profile in memory at the backend server that manages the smart vent application, and may be stored locally at the control unit 112. In other examples, a user accessing the smart vent application to configure a user profile may provide one or more images of themselves to be stored in association with their user profile.

In some implementations, the camera of the smart vent compares the captured video and or image data of the user to the stored images of the one or more user profiles to determine the identity of the user that provided the command. In examples where a user is in a room of the property 102 that has more than one smart vent, the smart vent that is located the closest proximity to the user may capture the video data, and communicate the determination to the other smart vents in the room. In other implementations, the camera of the smart vent communicates the captured data to the control unit 112, and the control unit 112 performs one or more facial recognition techniques to determine the identity of the user.

A user may provide a voice recording sample when configuring a user profile with the smart vent application. The user may provide a voice recording which is stored in association with the user profile. When the microphone on a smart vent receives a voice command from a user, the smart vent may communicate the captured data to the control unit 112. The control unit 112 compares the received voice command to the stored voice recording to determine the identity of the user that provided the voice command. For example, when there are two persons in a room and one person commands the smart vent to blow air away from me, the smart vent determines which of the two person provided the command based on determining the identity of the user and directs the air away from the spatial zone of that user.

The smart vent performs the command (330). The smart vent performs the command based on the received voice command or the detected gesture. In some implementations, the smart vent only performs a command when the command is provided by a user with a user profile. For example, when the control unit 112 cannot determine the identity of the user, the smart vent does not perform the detected command.

In some implementations, the armed status of the in-home monitoring system at the property 102 may determine whether or not the system performs a command. For example, when the system is armed away, the one or more smart vents assume that the property is unoccupied, based on assuming the house is unoccupied, the one or more smart vents operate to balance the temperature of each room. The one or more smart vents may be in a low power state where the camera and speaker may be switched off and therefore the smart vent may not detect a command. In other examples, when the system is armed away, the cameras on the one or more smart vents may be configured to identify when an animal enters a room. In these examples, the user may configure a pet setting, that specifies the direction of the baffles, the air flow rate, and an ideal temperature for a room when a pet enters the room. For example, when a pet enters a room when the system is armed away, the one or more smart vents may direct the airflow into the spatial zone with the pet. In some implementations, when the system is armed stay, or the system is disarmed, the one or more smart vents assume the property is occupied, and may continue to heat or cool the property based on the user set preferences and schedules.

Figure 4:
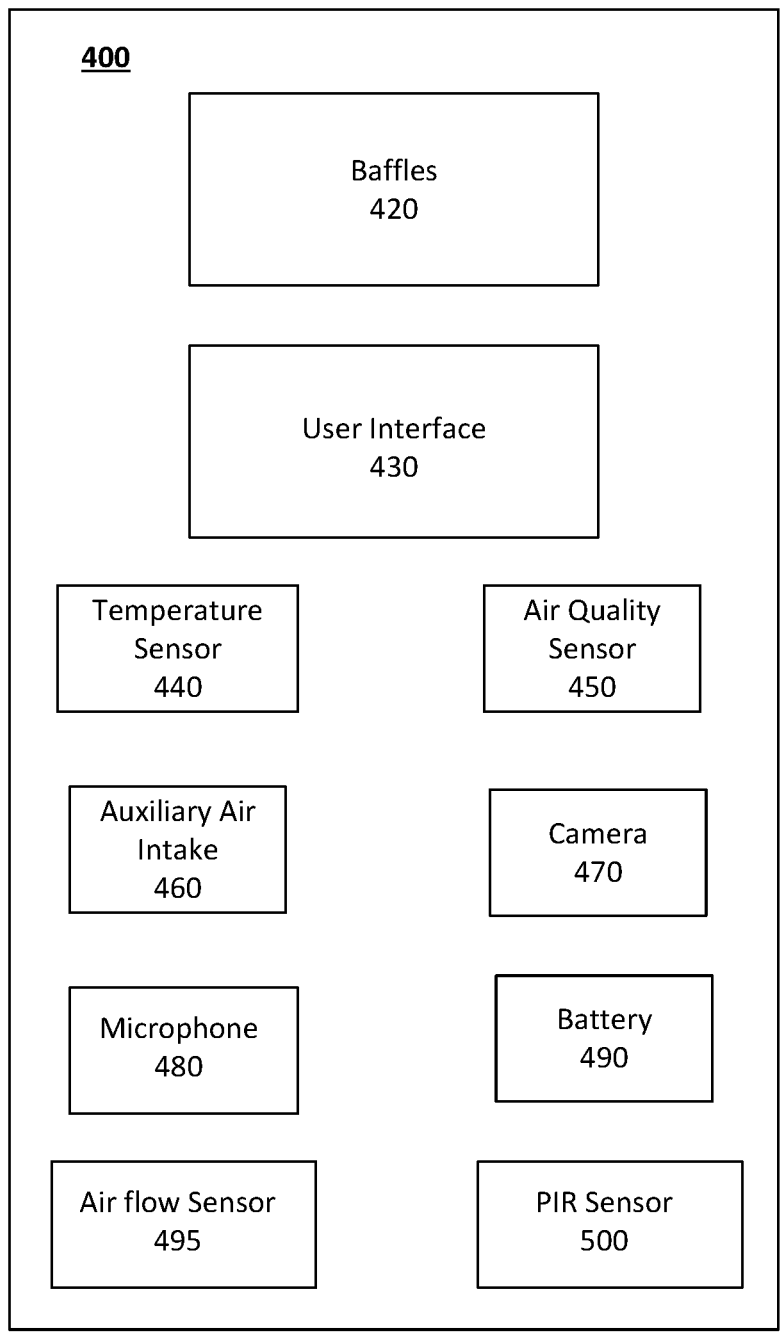
FIG. 4 illustrates an example of a smart vent.

FIG. 4 illustrates an example of a smart vent 400. As illustrated, the smart vent 400 may include one or more motorized baffles 410. The baffles 410 may be fin shaped, and may be configured to include both a vertical and horizontal direction across the front plate of the smart vent 400. The user 116 may adjust the direction of the flow of air from the smart vent 400 through the smart vent application. For example, the user 116 may access the smart application and specify that the smart vent in the kitchen air flow is directed to the ceiling.

The smart vent 400 may include an auxiliary air intake 460 that brings outside air to the smart vent 400. When the air quality sensor determines that the air quality of the air blowing out of the vent 400 is below a set value, the auxiliary air intake 460 is switched on until the measured air quality is below the set threshold. In some implementations, the smart vent 400 may include a micro air vent that mixes room temperature air with the conditioned air blown from the smart vent 400.

When the user 116 adjusts the air flow settings, the control unit 112 communicates with the motor 420 of the smart vent 400 to adjust the direction of the one or more baffles 410. In some examples, the smart vent 410 may include a vent control that is similar to the vent control system in an airplane. In these examples, the flow rate air may be adjusted by the motor 420 rotating the vent control. The user may adjust the direction of the baffles, either through the smart vent application or through the user interface 430 on smart vent to increase the mixing speed of the air that exits the smart vent. For example, the user may adjust the baffles to increase mixing so the air exiting the smart vent is milder than air that is blowing as a steady flow from the smart vent.

The smart vent 410 may include a user interface 430. The user interface 430 may be utilized by the user 116 to adjust the configurations of the smart vent 410. The user interface 430 may include an LCD display screen that identifies the one or more spatial zones of the room where the smart vent 410 is located, and the current flow rate of the air flow through the smart vent 410. In some implementations, the user 116 may adjust the volumetric flow rate of air to each of the one or more spatial zones within the room. The user may adjust the temperature of the air exiting on the vent through a temperature control on the vent interface.

The user 116 may adjust the air flow or the selected spatial regions by touching the screen of the user interface 430 and/or by performing two-finger motions. For example, the user 116 may select one or more spatial zones to increase the air flow rate by tapping on each of the one or more spatial zones, and by then tapping on a control to increase or decrease the flow rate. Similar to the smart vent application, the user interface 430 may be used to select an operating mode of the smart vent 400. The user 116 may choose to adjust the settings of the smart vent 410 through the user interface 430 or may adjust the settings through the smart application on the user's mobile device.

The smart air vent includes a camera 470. The camera may include a PIR sensor that is configured to detect heat radiated from living objects, and a low light sensor that is configured to detect movement of a living organism within the field of view of the sensor and camera lens. The smart vent includes a microphone 480, the microphone is configured to capture voice commands provided by a user. The smart vent may also include a replaceable battery 490. In some examples, the smart vent 400 may use a thermoselectric generator to charge the battery as air is blown from the vent. In other examples, the smart vent may be wired to the power system of the monitored property 102.

The smart vent 400 may include a temperature sensor 440, the temperature sensor 440 may be used to measure the actual temperature of the air exiting the smart vent 400. In some implementations, the smart vent system may be configured to automatically adjust the configurations of the one or more smart vents 104 to maintain a level of comfort for users within the property. For example, the user 116 may set an ideal air temperature for air exiting the vent when the heat is switched on to be 100 degrees Fahrenheit. Initially when the HVAC switches on to provide heat through the one or more vents, the temperature sensor 440 of the smart vent 400 measures the temperature of the air exiting the vent 400. As the smart vent 400 continues to blow heated air, the temperature of the air increases and the temperature sensor of the smart vent 400 detects when the temperature of the air exceeds the set 100 degrees Fahrenheit. The smart vent 400 may communicate with an air handler to increase the fan speed, by adjusting the fan speed of the air handler, the temperature of the air exciting the smart vent 400 is reduced.

In some implementations, where stratified air causes the different areas of a home to have different temperatures, the one or more smart vents may be used to balance the temperature in each of the rooms of the property. In these implementations, the return vents of the property may also be equipped with a smart vent. When the temperature sensors on each of the one or more smart vents sense temperatures, the one or more smart vents may communicate the registered temperatures to each other. The one or more smart vents on the return vents may be used to force air from the rooms where the smart vent detected higher temperatures to the rooms where the smart vent detected lower temperatures. For example, the smart vents on the highest level of a townhome may detect higher temperatures than the smart vents on the lowest level, and may cause the return vents to force the warm air from the higher levels down to the cooler lower levels. The one or more smart vents in the higher levels may continue to force the warm air to the lower levels until the difference in temperature is within a threshold.

The one or more smart vents may initiate this temperature balancing feature when the difference in the detected temperatures are above a user set threshold. For example, the one or more smart vents begin forcing the warmer air to the cooler room when the temperature difference is greater than five degrees. The user may configure the smart vent application to receive a notification when the one or more smart vents determine there is a temperature difference that exceeds the user set threshold. For example, the user may receive an in-app message notifying the user of the detected temperature difference. The message may indicate the detected temperature of each of the one or more smart vents throughout the property.

The smart vent 400 may include an air quality sensor 450. The air quality sensor 450 may be configured to measure the amount of particulate matter in the air blowing out of the smart vent 400. The air quality sensor 450 may also be configured to detect quantities of carbon dioxide and carbon monoxide. The one or more smart vents may be configured to automatically adjust the air intake of the smart vent 400 when the air quality sensor determines that the air quality is below a set threshold.

The smart vent 400 includes an air flow sensor 495. The air flow sensor measures the rate of flow of the air from the smart vent in real time. The user may have the ability to adjust the air flow of the smart vent through the smart vent application or through the user interface on the smart vent 400. The smart vent 400 includes a PIR sensor 500 that is configured to detect heat radiated from living objects.

Figure 5:
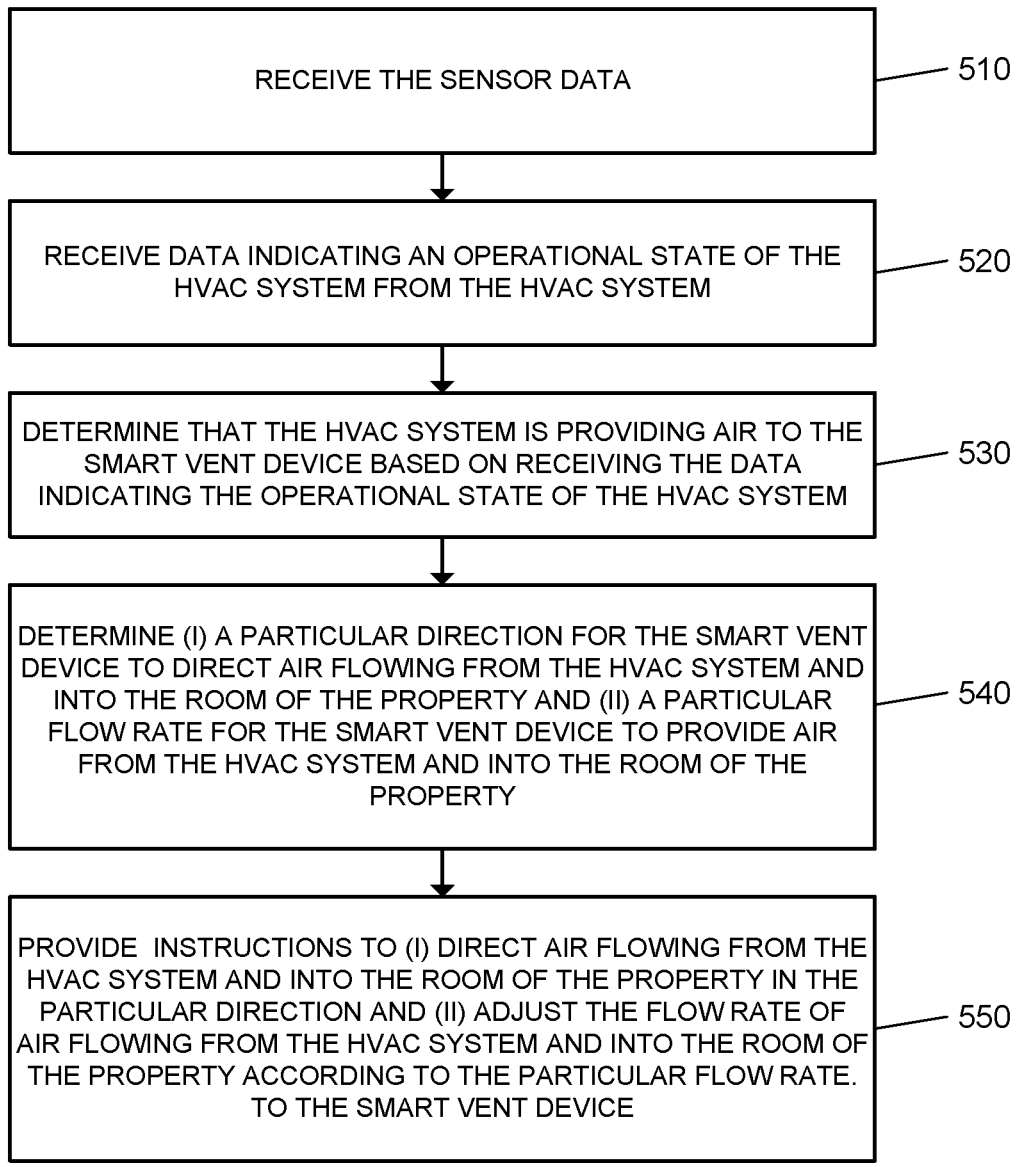
FIG. 5 is a flow chart of an example process for providing instructions to the smart vent device.

FIG. 5 illustrates an example process 500 for providing instructions to the smart vent device. The monitor control unit 112 receives sensor data (510). The monitor control unit 112 may receive motion sensor data from a motion sensor located in a room at the monitored property 102 when a resident enters the room. In some examples, the motion sensor may be a standalone sensor that is mounted to a wall or other surface in the room of the property 102. In other examples, the motion sensor is mounted to the front panel of the smart vent 104. The monitor control unit 112 may receive image data from a camera located in the room at the property 102. In some examples, the smart vent 104 may include a camera on a front panel of the smart vent 104. In other examples, the camera may be mounted to a wall of the room of the property 102. In some implementations, the camera of the smart vent 104 may include a PIR sensor that is configured to detect heat radiated from living objects, and a low light sensor that is configured to detect movement of a living organism within the field of view of the sensor and camera lens. In other implementations, the camera may include a PIR sensor. In some implementations, the monitor control unit 112 may receive sensor data from an infrared sensor that is configured to detect the heat radiated from a person.

The monitor control unit 112 receives data indicating an operational state of the HVAC system (520). The HVAC system may be in communication with the monitor control unit 102. The HVAC system may continuously communicate data to the monitor control unit 112. The data indicating the operation state may include the on or off status of the HVAC system, the temperature of the air being supplied, and whether is system is heating or cooling the property. The data indicating the operation state may include an identification of the smart vent device and the location of the smart vent device at the property 102. For example, the data may include smart vent device A is located in the master bedroom, and smart vent device B is located in the kitchen.

The monitor control unit 112 determines that the HVAC system is providing air to the smart vent device based on receiving the data indicating the operational state of the HVAC system (530). In some examples, the HVAC system may be supplying air to a portion of the one or more smart vent devices located throughout the property 102, in these examples, the data indicating the operational state may include which of the one or more smart vent devices is being supplied air, and which of the one or more smart vent devices are not. The operational state data of the HVAC system may also indicate whether the HVAC system is heating or cooling the monitored property 102.

The monitor control unit 112 determines (i) a particular direction for the smart vent device to direct air flowing from the HVAC system and into the room of the property and (ii) a particular flow rate for the smart vent device to provide air from the HVAC system and into the room of the property, based on the sensor data, and based on determining that the HVAC system is providing air to the smart vent device (540). The monitor control unit 112 may determine a direction for the smart vent device to direct air into the room of the property 102 based on a location of a user in the room. When the monitor control unit 112 receives image data from a camera located in the room with the smart vent device, the monitor control unit 112 may analyze the image data to determine a location of the one or more persons in the room of the property 102. In examples where the monitor control unit 112 receives motion sensor data from a motion sensor, the monitor control unit 112 may determine the location of the one or more persons in the room based on the motion data. The monitor control unit 112 may receive sensor data from a PIR sensor included in a camera located in a room. The PIR sensor is configured to detect the heat radiated off a living organism. The PIR sensor data indicates the location of the person in the room.

A resident of the monitored property 102 may set one or more rules and schedules for the configuration of the one or more smart vent devices through a smart vent application. For example, the resident may configure the one or more smart vent devices to increase the air flow and to direct the air flow away from the spatial zones where a person is detected. In other examples, the resident may configure the one or more smart vent devices to direct the air flow to the spatial zones where a person is detected. The resident user may set preferences for each of the one or more other residents of the property 102. For example, the resident user may configure, through the smart vent application, the one or more smarts vent devices to direct air flow to resident A when located in a room, and the one or more smart vent devices to direct air flow away from resident B. For another example, the resident user may configure the one or more smart vent devices to oscillate when resident C is in a room. In these examples, the monitor control unit 112 may determine the identity of a person in a room based on analyzing the image data received from the one or more cameras in the room. The monitor control unit 112 may use classification analytics to determine the identity of the person in the room, and based on the identity of the person in the room, the monitor control unit 112 may determine the direction of air flow and the flow rate for the smart vent device. The monitor control unit 112 may utilize facial recognition techniques to determine the identity of the person in the capture image data. In some examples, the resident user may indicate preferences that specify an air flow rate for the smart vent device when each resident is located in the room. For example, the resident user may configure preferences to increase the air flow rate when user A is detected in the master bedroom. In some implementations, the user may set preferences to indicate that the smart vent device should direct the air flow towards the direction of any person that enters the room. In other implementations, the user may set preferences to indicate that the smart vent device should direct the air flow away from any person that enters the room.

In some implementations, where the monitor control unit 112 receives image data from a camera, the monitor control unit 112 may detect that the image data includes one or more gestures. The monitor control unit 112 may perform classification analytics to detect the one or more gestures being performed by a user. For example, the monitor control unit may detect that a user is making an "X" gesture with their hands indicating that the user wants to stop air blowing in their direction. The resident user may configure the one or more different gestures by accessing the smart vent application. During the initial configuration of the one or more smart vent devices, the resident may configure a gesture for increasing the air flow, decreasing air flow, shutting off the air flow, increasing the set point temperature of the HVAC system, decreasing the set point temperature of the HVAC system, and any other appropriate gesture. The resident user may train the system to detect the gestures from the one or more residents of the monitored property 102.

In some implementations, the one or more smart vent devices may include a microphone, and the user may adjust the air flow based on receiving a voice command from a user. In these implementations, the monitor control unit 112 receives the voice data from the microphone of the smart vent device, and adjust the direction of the air flow and the air flow rate based on the received command. The resident user may configure the one or more smart vent devices to shut off the air flow when the user commands a vent to shut off air flow, or to close vent. The resident may configure the one or more smart vent devices to increase the air flow when a user commands a vent to open a vent, or increase air flow.

In some implementations, the monitoring control 112 may be configured to learn the preferences of the one or more residents of the monitored property 102. In these implementations, the monitor control unit 112 may store the historical information associated with a particular resident. For example, the monitor control unit 112 may determine that user A wants the air to blow in their direction and user B wants the air to blow away from them.

The monitor control unit 112 provides instructions to the smart vent device to (i) direct air flowing from the HVAC system and into the room of the property in the particular direction and (ii) adjust the flow rate of air flowing from the HVAC system and into the room of the property according to the particular flow rate (550). Based on the determinations made by the monitor control unit 112, the monitor control unit 112 communicates with the smart vent device. For example, when the monitor control unit 112 determines resident A is in the master bedroom near smart vent A, and the user commands the smart vent to blow air towards the resident, the monitor control unit 112 provides instructions to the smart vent A to adjust the air flow in the direction of the location of A, and to increase the air flow rate.

In some examples, when sensor data that indicates that a person entered a room where the smart vent device is located, the monitor control unit 112 provides instructions to direct the air flow away from the person and increase flow rate of air. For example, a person may enter the room after exercising and may have an elevated body temperature, and the monitor control unit may provide instructions to direct the air flow towards the person with the elevated body temperature. When the monitor control unit 112 receives thermal radiation data from an infrared detector that indicates that a person with an increased body temperature is in the room, and the monitor control unit 112 determines that the HVAC system is heating the property, the monitor control unit 112 may determine to direct the air flow away from the person with the elevated body temperature. For example, the monitor control unit 112 provides instructions to the smart vent device to adjust the one or more baffles to direct the air flow away from the person with the elevated body temperature. When the monitor control unit 112 receives thermal radiation data from an infrared detector that indicates that a person with an increased body temperature is in the room, and the monitor control unit 112 determines that the HVAC system is cooling the property, the monitor control unit 112 may determine to direct the air flow towards the person with the elevated body temperature and to increase the air flow rate. For example, the monitor control unit 112 provides instructions to the smart vent device to adjust the one or more baffles to direct air flow toward the person with the elevated body temperature, and instructions to increase the rate of the fan of the smart vent device.

In some examples, when the sensor data is image data that indicates that a person is in a kitchen of the property 102 cooking, the monitor control unit 112 may determine whether the HVAC system is heating or cooling the property. The monitor control unit 112 may determine to adjust the air flow direction away from the person based on determining that the HVAC system is heating the property 102. The monitor control unit 112 may determine to adjust the air flow direction toward the person based on determining that the HVAC system is cooling the property 102. The monitor control unit 112 may determine to increase the air flow based on determine that the HVAC system is producing cool air. For example, the monitor control unit 112 provides instructions to the smart vent device to adjust the baffles to direct the cool air towards the person, and to increase the fan speed to increase the air flow rate.

In some examples, when the sensor data is image data that indicates that a person is under a blanket, the monitor control unit 112 may determine whether the HVAC system is heating or cooling the property. The monitor control unit 112 may determine to adjust the air flow direction towards the person based on determining that the HVAC system is heating the property. The monitor control unit 112 may determine to adjust the air flow direction away from the person under the blanket based on determining that the HVAC system is cooling the property. In some examples, when the sensor data is image data that indicates that a person entered the property from outside, the monitor control unit may determine whether to adjust the air flow toward the person based on weather data. In these examples, the monitor control unit 112 may be in communication with an external server that provides that current weather conditions at the property. When the monitor control unit determines that a person entered the property from outside, the monitor control unit determines whether it is hot or cold outside based on the weather data. For example, the monitor control unit 112 may determine to adjust the heated air toward the person when the person entered from outside and the weather was cold. For another example, the monitor control unit 112 may determine to adjust the cooled air toward the person when the person entered from outside and the weather was hot.

In some implementations, when the monitor control unit 112 determines the in-home monitoring system at the property 102 is armed away, the monitor control unit 112 assumes that the property 102 is unoccupied. Based on assuming that the monitored property is unoccupied, the one or more smart vent devices operate to balance the temperature of each room. In some implementations, the one or more smart devices may decrease the air flow rate of each of the one or more smart vents when the property 102 is unoccupied. In some implementations, when the monitor control unit 112 determines that the monitoring system is armed away, the monitor control unit 112 determines to adjust the direction of the air flow toward a zone of the room the person is likely to enter. For example, the monitor control unit may determine to adjust the direction of the air flow toward the door of the room.

In some implementations, when the monitor control unit 112 determines the in-home monitoring system at the property 102 is unarmed, the monitor control unit 112 assumes that the property is occupied. Based on assuming that the property is occupied, the monitor control unit 112 may provide instructions to increase the air flow rate of the smart vent devices in the rooms of the property that are occupied, and provide instructions to decrease the air flow rate of the smart vent devices in the rooms of the property that are unoccupied.

In some implementations, the smart vent device may include an auxiliary air intake that brings outside air to the smart vent device. In some examples, when an air quality sensor determines that the air quality of the air blowing out of the smart vent device is below an optimum value, the auxiliary air intake may be switched on until the measured air quality is below the set threshold. In some implementations, the smart vent device may include a micro air vent that mixes room temperature air with the conditioned air blown from the smart vent 400. For example, when the HVAC system is cooling the property, and the smart vent device is directed toward a person in the room, the micro air vent may introduce room temperature air to mix with the cooled air.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system that is configured to monitor a property, the monitoring system comprising:
   a camera that is configured to generate image data;
   a smart vent device that includes a secondary air vent that is configured to draw room temperature air into the smart vent device and that is configured to direct air flowing from an HVAC system of the property to a room of the property; and
   a monitor control unit that includes a processor and a network module and that is configured to:
      obtain, from the camera, the image data;
      determine, from the image data, that a person is in a first spatial zone in the room and not in a second spatial zone in the room;
      determine, based on determining that the person is in the first spatial zone and an operational state of the HVAC system, that air is being blown on the person by the smart vent device;
      determine, from the image data, that the person is under a blanket; and
      based on determining that the person is under the blanket and the operational state of the HVAC system, adjust a direction of baffles of the smart vent device to blow air away from the first spatial zone in the room and towards the second spatial zone in the room.

2. The monitoring system of claim 1, wherein:
   the monitor control unit is configured to:
      adjust a flow rate of air flowing from the HVAC system of the property to the room of the property; and
      adjust a temperature of air flowing into the room of the property by drawing the room temperature air into the smart vent device, mixing the room temperature air with air from the HVAC system, and directing the mixed room temperature air and air from the HVAC system into the room of the property.

3. The monitoring system of claim 1, wherein:
   the monitoring system comprises a sensor that is an infrared detector configured to sense thermal radiation; and
   the monitor control unit is configured to:
      receive thermal radiation data from the sensor;
      based on the thermal radiation data, determine that the person has a body temperature elevated above an average body temperature; and
      based on determining that the person has the elevated body temperature, adjust the direction of the baffles of the smart vent device to blow air away from the first spatial zone in the room and towards the second spatial zone in the room.

4. The monitoring system of claim 1, wherein the monitor control unit is configured to:
   receive a timing schedule that identifies a first operating mode for the smart vent device corresponding to a first range of time;
   compare a current time to the first range of time corresponding to the first operating mode for the smart vent device;
   determine that the current time is within the first range of time corresponding to the first operating mode for the smart vent device; and
   based on determining that the current time is within the first range of time corresponding to the first operating mode for the smart vent device, adjust the direction of the baffles of the smart vent device to blow air away from the first spatial zone in the room and towards the second spatial zone in the room.

5. The monitoring system of claim 1, wherein the monitor control unit is further configured to:
   based on the image data, detect that the person is issuing a command; and
   adjust the direction of the baffles of the smart vent device based on the command.

6. The monitoring system of claim 5, wherein:
   the monitoring system comprises a microphone that is configured to detect sound, and
   the monitor control unit is configured to:
      receive sound data from the microphone; and
      detect that the person is issuing the command based on the sound data.

7. The monitoring system of claim 1, wherein the monitor control unit is further configured to:
   determine that an armed status of the monitoring system is armed away; and
   adjust the direction of the baffles of the smart vent device based on determining that the monitoring system is armed away.

8. The monitoring system of claim 1, wherein the monitor control unit is further configured to:
   receive data indicating an operating mode for the smart vent device; and
   based on receiving the data indicating the operating mode for the smart vent device, provide, to the smart vent device, instructions to adjust the direction of the baffles of the smart vent device.

9. The monitoring system of claim 1, wherein the smart vent device includes a fan that is configured to adjust an air flow rate of the smart vent device.

10. The monitoring system of claim 8, wherein the monitor control unit is further configured to receive the data indicating the operating mode for the smart vent device based on the person operating a user interface corresponding to the smart vent device.

11. The monitoring system of claim 1, wherein the smart vent device includes an air vent that is configured to mix outdoor air with air flowing from the HVAC system.

12. The monitoring system of claim 1, wherein the baffles of the smart vent device include one or more adjustable baffles that are configured to adjust a direction of the air flowing from the HVAC system.

13. The monitoring system of claim 1, wherein the smart vent device includes a temperature sensor.

14. The monitoring system of claim 1, wherein determining that the person is under the blanket comprises:
   performing object recognition on the image data to determine the person is covered by the blanket.

15. The monitoring system of claim 1, wherein the monitor control unit is configured to:
   determine weather conditions at the property; and
   based on the weather conditions at the property, adjust the direction of baffles of the smart vent device or temperature of air blown by the smart vent device.

16. A computer implemented method, comprising:
   obtaining, by a monitoring system configured to monitor a property and from a camera that is configured to generate image data, image data;
   determining, from the image data, that a person is in a first spatial zone in a room and not in a second spatial zone in the room;

determining, based on determining that the person is in the first spatial zone and an operational state of an HVAC system, that air is being blown on the person by a smart vent device that is configured to direct air flowing from the HVAC system to the room;

determine, from the image data, that the person is under a blanket; and based on determining that the person is under the blanket and the operational state of the HVAC system, adjusting a direction of baffles of the smart vent device to blow air away from the first spatial zone in the room and towards the second spatial zone in the room.

17. A non-transitory computer-readable storage medium storing software comprising instructions executable by one or more computers which, upon such execution, cause the one or more computers to perform operations comprising:

obtaining, from a camera that is configured to generate image data, image data;

determining, from the image data, that a person is in a first spatial zone in a room and not in a second spatial zone in the room;

determining, based on determining that the person is in the first spatial zone and an operational state of an HVAC system, that air is being blown on the person by a smart vent device that is configured to direct air flowing from the HVAC system to the room;

determine, from the image data, that the person is under a blanket; and based on determining that the person is under the blanket and the operational state of the HVAC system, adjusting a direction of baffles of the smart vent device to blow air away from the first spatial zone in the room and towards the second spatial zone in the room.

\* \* \* \* \*